May 26, 1959 — H. T. MOOERS — 2,888,622
TRANSISTOR MOTOR CONTROL
Filed Aug. 15, 1955
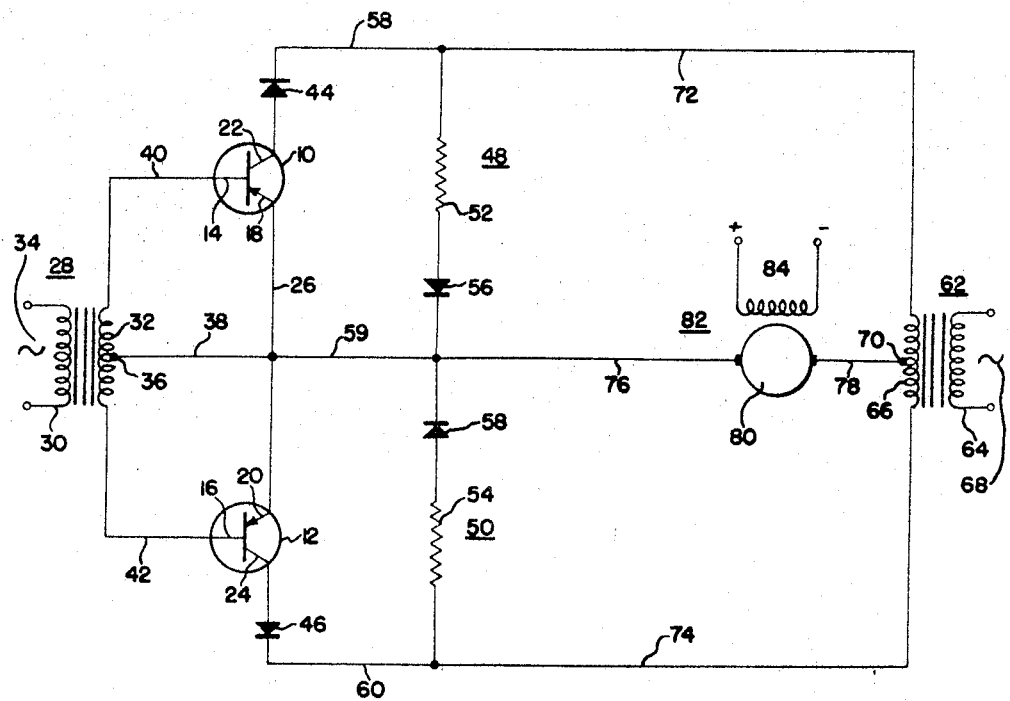
INVENTOR.
HOWARD T. MOOERS
BY Joseph E Ryan
ATTORNEY

United States Patent Office 2,888,622
Patented May 26, 1959

2,888,622
TRANSISTOR MOTOR CONTROL

Howard T. Mooers, Minneapolis, Minn., assignor to Minneapolis-Honeywell Regulator Company, Minneapolis, Minn., a corporation of Delaware Application August 15, 1955, Serial No. 528,272

7 Claims. (Cl. 318—257)

My invention relates to the control of a direct current type motor from an alternating current source and more specifically relates to the control of both speed and direction of rotation of the direct current motor by a current control means.

The primary object of this invention is to operate a direct current, reversible device from an alternating current source and further to use an alternating current signal for control of the device.

A further object is to operate a direct current reversible motor from an alternating current source and to utilize the alternating current source in a full wave manner while controlling the speed of the motor by the use of an alternating current signal of the same frequency as the supply voltage.

Still another object of this invention is to utilize a grounded emitter or grounded base transistor circuit configuration for the control of a direct current device by the use of an alternating current control signal.

These and other objects will become apparent from a consideration of the following specification when considered with the single sheet of drawings attached thereto.

The novel motor control system, which is described in detail below, basically consists of an input transformer supplying a signal to a pair of PNP type transistors which are utilized in a grounded emitter configuration. Asymmetric conductive elements, in the form of dry plate rectifiers, provide current control in conjunction with the transistors to operate a direct current motor through an alternating current power supply. A full wave utilization of the alternating current pulses is made by the novel circuitry and the motor is controlled completely in speed and direction, depending on the phase and amplitude of the input control signal. It is understood that by proper arrangement of the rectifiers it would be possible to utilize other forms of semi-conductor type elements, and the example given is that of the preferred embodiment.

In the preferred embodiment two PNP type transistors 10 and 12 are utilized. These transistors have base electrodes 14 and 16, emitter electrodes 18 and 20, and collector electrodes 22 and 24. The emitter electrodes 18 and 20 are joined by a common conductor 26.

An input signal transformer, generally shown at 28, has a primary winding 30 and a secondary winding 32. The primary winding 30 is energized by an alternating current signal represented at 34. The secondary winding 32 further has a tap 36, which in this embodiment is a center tap, and tap 36 is joined to conductor 26 by conductor 38. The base electrodes 14 and 16 of transistors 10 and 12 are joined by conductors 40 and 42 to the secondary 32. The direction of current flow from collectors 22 and 24 are further regulated through dry plate type rectifiers 44 and 46. Two impedance means generally shown at 48 and 50 each consists of a series combination of resistors 52 and 54 and rectifiers 56 and 58. The impedance means 48 is paralleled with rectifier 44 and transistor 10 by means of conductors 58 and 59. The impedance means 50 is paralleled with the transistor 12 and rectifier 46 by conductors 59 and 60.

A power input transformer is generally shown at 62 and consists of a primary winding 64 and a secondary winding 66. The primary winding 64 is energized, as represented at 68, by an alternating current supply voltage. The supply voltage 68 is of the same frequency as the signal voltage represented at 34. The transformer secondary 66 has a center tap 70. The secondary winding 66 is connected across the impedance means 48 and 50 by means of conductors 72 and 74. The center tap 36 of transformer 28 is connected to the center tap 70 of transformer 62 by means of conductors 38, 59, 76, 78, and an armature 80 of a direct current motor, generally shown at 82. The direct current motor, schematically represented at 82, may have a field winding 84 which would be energized from a suitable direct current source (not shown). It should be noted that the winding 84, of course, could be replaced by a permanent magnet arrangement.

Operation

The operation of this motor control circuit can best be understood by assuming certain instantaneous polarities of voltage across the secondary 32 of transformer 28 and the secondary 66 of transformer 62. If no signal whatsoever is supplied to the input of transformer 28 and an alternating current voltage 68 is supplied to transformer 62, an instantaneous voltage can be assumed which would be positive at the top of winding 66 and negative at its bottom. The transistors 10 and 12 allow substantially no current flow from the emitters 18 and 20 to the collectors 22 and 24 respectively, when no signal is present at the secondary 32 of transformer 28. Under the conditions established above, the transistors 10 and 12 act as infinite impedances and substantially no current flows through either of these devices. With the voltage across secondary 66 of positive at the top and negative at the bottom, a current flows from the top of the secondary winding 66 through conductor 72, impedance means 48, conductor 76, armature 80, conductor 78, and back to the secondary winding 66. It will be noted that the current flow through the armature 80 is in a direction from conductor 76 to 78. At the same instant the rectifier 58 of the impedance means 50 eliminates any current flow from the center tap 70 of transformer secondary 66 to conductors 78, armature 80, conductor 76, rectifier 58, resistor 54, conductor 74, and the bottom section of secondary winding 66. Upon a reversal of the instantaneous polarity across the transformer secondary 66 a current is allowed to flow in the bottom loop basically consisting of the armature 80, impedance means 50, and transformer secondary 66. At the same time no current is allowed to flow in the upper loop which basically consists of the armature 80, impedance means 48, and the upper part of secondary winding 66. It will thus be noted that as each reversal of phase takes place that a current would flow from conductor 76 to 78 through the armature 80, in a manner normally referred to as the full wave operation. Under the condition of no signal on the input of transformer 28 it can be seen that the motor 82 will operate at a maximum speed in a direction determined by the current flow from conductor 76 to conductor 78 and the field 84.

If a control voltage is supplied to transformer 28 in such a manner that the secondary winding 32 of the transformer has a polarity which is in phase with the polarity of the voltage developed across the secondary 66, a complete control of speed and direction of motor 80 is accomplished. With similar polarities at the tops of windings 32 and 66, it will be noted that one transistor will remain cutoff while the other transistor is allowed to conduct from the emitter to the collector as pointed out below. Assuming a positive polarity at the top of windings 32 and 66, it will be noted that the base 16 of transistor 12 will be driven more negative with respect to emitter 20. Under this condition the transistor 12 begins to conduct and the amount of conduction is a function of the magnitude of the voltage applied between the emitter 20 and the base 16. With a positive polarity at the top of windings 32 and 66 it has been noted that a current flows in the basic loop consisting of the armature 80, impedance means 48, and the top of transformer winding 66, and this current flows from conductor 76 and 78. As the conduction of transistor 12 increases a current will be allowed to flow from the center tap 70 of transformer secondary 66 through the armature 80, transistor 12, rectifier 46, and back to the bottom of transformer secondary 66. It will be noted that this current flow is from conductor 78 to conductor 76, or in direct opposition to the previously described current flow. As the voltage applied to the base 16 of transistor 12 becomes more and more negative with respect to the emitter 20, the current flow through the transistor 12 increases substantially. For one particular level of voltage from the base 16 to the emitter 20, the current flow through the transistor 12, rectifier 46, conductors 60, 74, secondary winding 66, conductor 78, armature 80, conductor 76, and conductor 59 equals the current flowing in the upper loop basically consisting of the armature 80, impedance means 48, and secondary 66. It will be appreciated that when these current flows are equal that they balance one another out and the motor is allowed to come to rest. If the voltage applied to the base 16 of transistor 12 is made still more negative with respect to emitter 20, the transistor 12 increases its conduction further and this current overrides the current flowing through the armature 80. As this current overrides the current flowing in armature 80, the motor reverses direction and increases speed in the reverse direction. As the polarity of both transformers 32 and 66 reverse the operation remains substantially the same except that transistor 10 begins to conduct in opposition to the current flow in the lower loop consisting of the motor armature 80, impedance means 50, and second 66.

It is thus seen that a direct current motor can be controlled from zero speed to a maximum speed in either direction of rotation by applying an alternating current energization to the proper current control means. It is obvious that by applying a constant alternating current voltage 34 to the input of transformer 28 that it would be possible to maintain the operation of the motor 82 at a standstill. Also any variation of the voltage from this particular level would cause rotation in one direction or the other by the motor 82. It is understood that a direct substitution of a NPN type transistor could be made for transistors 10 and 12 by changing the direction of current flow to the rectifiers 44, 46, 56, and 58. Also, a substitution of a grounded base configuration could be made for the grounded emitter configuration without deviating from the scope of this invention. It is further understood that the embodiment disclosed is that which is preferred, but that the applicant does not wish to be limited to this one embodiment. The motor control circuit illustrated as the preferred embodiment in the drawing is subject to many changes without departing from the spirit of the invention and it is therefore expressly understood that the scope of the invention is to be determined solely by the appended claims.

I claim as my invention:

1. In a motor control system, two current control means each comprising PNP type transistor means having a plurality of electrodes including a base, an emitter, and a collector, an asymmetric conductive element in series with said collector electrode, an input signal transformer having a secondary winding connected to each of said base electrodes, said winding including a center-tap connected to said emitter electrodes, impedance means each comprising a second asymmetric conductive element and series resistor connected in parallel relation with said current control means and first asymmetric conductive element, a power transformer having a secondary winding connected to said impedance means and said winding including a center-tap connection, and a direct current motor including an armature means connecting said transformer center-taps and having a constantly energized field.

2. In a motor control system, two current control means each comprising NPN type transistor means having a plurality of electrodes including a base, an emitter, and a collector, an asymmetric conductive element in series with said collector electrode, an input signal transformer having a secondary winding connected to each of said base electrodes, said winding including a center-tap connected to said emitter electrodes, impedance means each comprising a second asymmetric conductive element and series resistor connected in parallel relation with said current control means and first asymmetric conductive element, a power transformer having a secondary winding connected to said impedance means and said winding including a center-tap connection, and a direct current motor including an armature means connecting said transformer center-taps and having a constantly energized field.

3. In a motor control system, current control means comprising semi-conductor means having a plurality of electrodes including bases, emitters, and collectors, asymmetric conductive elements in series with collector electrodes, an input signal transformer having a secondary winding connected to said base electrodes, said winding including a center-tap connected to said emitter electrodes, impedance means including second asymmetric conducting elements connected in parallel relation with said current control means and first asymmetric conducting elements, a power transformer having a secondary winding connected to said current control means and said winding including a center-tap connection, and a direct current motor including armature means connecting said transformer center taps and having a constantly maintained field.

4. In a motor control system, two current control means each comprising semi-conductor means having a plurality of electrodes including a base, an emitter, and a collector, signal input means connected to said base electrodes, said input means including a tap connected to said emitter electrodes, first and second impedance means each including asymmetric conductive means connected in parallel with the collector and one other of said electrodes of said two current control means, respectively, each of said asymmetric conducting means being poled to conduct current in the opposite direction to the flow through the respective paralleled semiconductor means, power input means in circuit with said impedance means, said power input means including a tap connection, and a direct current motor including armature means connecting said taps and having a constantly maintained field.

5. In a motor control system, two current control means each having a plurality of electrodes, signal input means connected to first electrodes, said input means including a tap connected to second electrodes, impedance means including first and second asymmetric conducting means connected in parallel, respectively, with the output circuit of both of said current control means, a second power input means in circuit with said current control means and said paralleled impedance means, said second power input means including a tap connection, and a motor including armature means connecting said taps and having a constantly maintained field.

6. Motor control apparatus comprising: semi-conductor means having a plurality of electrodes including a base, an emitter and a collector electrode, two of said electrodes comprising input terminals for said means; a source of variable magnitude signal current; means connecting said source of signal current to said input terminals; impedance means comprising asymmetric current conducting means; a source of alternating current potential; means connecting said semiconductor means, said impedance means and said source of potential in a series loop; direct current responsive motor means; and means connecting said motor means to a first junction between said semi-conductor means and said impedance means, and to a mid terminal on said source of potential.

7. Motor control apparatus comprising: semi-conductor means having a plurality of electrodes, two of said electrodes comprising input terminals for said means; a source of variable magnitude signal current; means connecting said source of signal current to said input terminals; impedance means comprising asymmetric current conducting means; a source of alternating current potential; means connecting said semi-conductor means, said impedance means and said source of potential in a series loop; motor means; and means connecting said motor means to a first junction between said semi-conductor means and said impedance means, and to a terminal on said source of potential.

References Cited in the file of this patent

UNITED STATES PATENTS

| | | |
|---|---|---|
| 2,399,387 | Reilly | Apr. 30, 1946 |
| 2,698,392 | Herman | Dec. 28, 1954 |